US012066292B2

(12) United States Patent
Rezvani

(10) Patent No.: US 12,066,292 B2
(45) Date of Patent: *Aug. 20, 2024

(54) EMERGENCY DRONE GUIDANCE DEVICE

(71) Applicant: Alarm.com Incorporated, Tysons, VA (US)

(72) Inventor: Babak Rezvani, St Petersburg, FL (US)

(73) Assignee: Alarm.com Incorporated, Tysons, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/325,571

(22) Filed: May 30, 2023

(65) Prior Publication Data

US 2023/0304803 A1    Sep. 28, 2023

Related U.S. Application Data

(63) Continuation of application No. 17/369,208, filed on Jul. 7, 2021, now Pat. No. 11,698,260, which is a
(Continued)

(51) Int. Cl.
*G01C 21/20* (2006.01)
*B64C 39/02* (2023.01)
(Continued)

(52) U.S. Cl.
CPC .......... *G01C 21/206* (2013.01); *B64C 39/024* (2013.01); *G01C 21/343* (2013.01);
(Continued)

(58) Field of Classification Search
CPC ............... G01C 21/206; G01C 21/343; G01C 21/3638; B64C 39/024; B64C 2201/12;
(Continued)

(56) References Cited

U.S. PATENT DOCUMENTS 8,948,935 B1   2/2015 Peeters et al.
9,373,014 B1   6/2016 Mehranfar
(Continued)

FOREIGN PATENT DOCUMENTS

CA   2979408   9/2016
CA   3000035   4/2017
(Continued)

OTHER PUBLICATIONS

"At CES, flying drones are Alarm.com's home security moonshot" Ry Crist, Jan. 3, 2017, cnet.com retrieved from https://www.cnet.conn/news/at-ces-flying-drones-are-alarm-conn-home-security-moonshot-ces-2017/ (Year: 2017).
(Continued)

*Primary Examiner* — Hussein Elchanti
(74) *Attorney, Agent, or Firm* — Fish & Richardson P.C.

(57) ABSTRACT

Techniques are described for configuring a monitoring system to assist users during a detected emergency condition at a property. In some implementations, sensor data from one or more sensors that are located at the property are obtained by a monitoring system that is configured to monitor the property. A determination that there is an emergency condition at the property is made by the monitoring system based on the sensor data, determining. A location of a person inside the property is determined by the monitoring system based on the sensor data. A first path to the person and a second path to guide the person away from the emergency condition are determined by the monitoring system. The first path to the person and the second path to guide the person away from the emergency condition are navigated by a computing device of the monitoring system.

20 Claims, 4 Drawing Sheets

Related U.S. Application Data continuation of application No. 16/875,293, filed on May 15, 2020, now Pat. No. 11,060,873, which is a continuation of application No. 15/867,175, filed on Jan. 10, 2018, now Pat. No. 10,655,968.

(60) Provisional application No. 62/444,421, filed on Jan. 10, 2017.

(51) Int. Cl.
| | | |
|---|---|---|
| *G01C 21/34* | (2006.01) | |
| *G01C 21/36* | (2006.01) | |
| *G05D 1/00* | (2006.01) | |
| *G06T 17/05* | (2011.01) | |
| *G08B 7/06* | (2006.01) | |
| *B64U 101/00* | (2023.01) | |

(52) U.S. Cl.
CPC ....... *G01C 21/3638* (2013.01); *G05D 1/0055* (2013.01); *G05D 1/102* (2013.01); *G06T 17/05* (2013.01); *G08B 7/066* (2013.01); *B64U 2101/00* (2023.01); *B64U 2201/10* (2023.01)

(58) Field of Classification Search
CPC ............ B64C 2201/141; G05D 1/0055; G05D 1/102; G06T 17/05; G08B 7/066
See application file for complete search history.

(56) References Cited

U.S. PATENT DOCUMENTS

| | | | |
|---|---|---|---|
| 9,464,907 B1 | 10/2016 | Hoareau et al. | |
| 9,589,448 B1 | 3/2017 | Schneider et al. | |
| 9,836,885 B1 | 12/2017 | Eraker et al. | |
| 10,042,086 B1 | 8/2018 | Smalley | |
| 10,655,968 B2 | 5/2020 | Rezvani | |
| 11,745,870 B1 * | 9/2023 | Nevdahs ................ | B64U 10/13 244/17.13 |
| 2004/0073368 A1 | 4/2004 | Gonzalez-Banos et al. | |
| 2011/0112660 A1 | 5/2011 | Bergmann et al. | |
| 2014/0118140 A1 | 5/2014 | Amis | |
| 2014/0172727 A1 | 6/2014 | Abhyanker et al. | |
| 2015/0109338 A1 | 4/2015 | McKinnon et al. | |
| 2015/0127486 A1 | 5/2015 | Advani | |
| 2015/0339912 A1 | 11/2015 | Farrand et al. | |
| 2016/0047663 A1 | 2/2016 | Iyer et al. | |
| 2016/0063642 A1 | 3/2016 | Luciani et al. | |
| 2016/0088286 A1 | 3/2016 | Forsythe et al. | |
| 2017/0011477 A1 | 1/2017 | Murphey | |
| 2017/0199044 A1 | 7/2017 | Hoareau et al. | |
| 2017/0341746 A1 | 11/2017 | Erickson et al. | |
| 2018/0005143 A1 | 1/2018 | Camargo et al. | |
| 2018/0137728 A1 | 5/2018 | Hahn | |
| 2018/0165504 A1 * | 6/2018 | Kerzner ................ | G08G 5/0013 |
| 2018/0178781 A1 | 6/2018 | Funk et al. | |
| 2018/0195868 A1 * | 7/2018 | Rezvani ................ | G01C 21/343 |
| 2018/0356241 A1 * | 12/2018 | Correnti ............... | G01C 21/206 |
| 2019/0012887 A1 | 1/2019 | Troesch et al. | |
| 2019/0217131 A1 | 7/2019 | Zechlin | |
| 2020/0278209 A1 * | 9/2020 | Rezvani ............. | G01C 21/3638 |
| 2021/0034077 A1 * | 2/2021 | Rezvani ................ | B64C 39/024 |
| 2021/0333109 A1 * | 10/2021 | Rezvani ............... | G01C 21/343 |
| 2023/0303247 A1 * | 9/2023 | Nevdahs ............... | B64C 39/024 |

FOREIGN PATENT DOCUMENTS

| | | |
|---|---|---|
| KR | 101653125 | 9/2016 |
| WO | WO2016/180796 A2 | 11/2016 |
| WO | WO2016/180796 A3 | 11/2016 |

OTHER PUBLICATIONS

"Unmanned aerial vehicle—Wikipedia", version published Jan. 6, 2017. Retrieved from https://en.wikipedia.org/w/index.php?title=Unmanned_aerial_vehicle&oldid=758625048 (29 pages).

AU Examination Report in Australian Appln. No. 2021204810, dated Oct. 5, 2022, 5 pages.

AU Examination Report in Australian Appln. No. 2021204810, dated Oct. 6, 2022, 6 pages.

AU Examination Report in Australian Appln. No. 2022200322, dated Feb. 27, 2023, 4 pages.

AU Re-examination Report in Australian Appln. No. 2021204810, dated Jan. 24, 2023, 6 pages.

AU Re-examination Report in Australian Appln. No. 2021204810, dated Apr. 17, 2023, 6 pages.

CA Office Action in Canadian Appln. No. 3,049,726, dated Feb. 9, 2023, 4 pages.

Canadian Office Action in Canadian Application No. 3,049,726, dated Jul. 30, 2020, 6 pages.

European Office Action in European Application No. 18738855.8, dated Oct. 28, 2020, 7 pages.

Extended European Search Report in European Application No. 18738855.8, dated Dec. 16, 2019, 10 pages.

International Search Report and Written Opinion in International Application No. PCT/US18/13146, dated Mar. 28, 2018, 120 pages.

Measure-Red Cross, "Drones for Disaster Response and Relief Operations," IssueLab, Apr. 1, 2015, 52 pages, XP055646197.

Mutlu et al., "Indoor Navigation and Guidance of an Autonomous Robot Vehicle with Static Obstacle Avoidance and Optimal Path Finding Algorithm", IFAC the 2012 IFAC Workshop on Automatic Control in Offshore Oil and Gas Production, vol. 45, No. 24, Sep. 12-14, 2012, pp. 315-319, XP055743128, Red Hook, NY.

PCT International Preliminary Report on Patentability in International Application No. PCT/US2018/013146, dated Jul. 25, 2019, 6 pages.

Robinette et al, "Overtrust of Robots in Emergency Evacuation Scenarios," Human Robot Interation, IEEE Press, Mar. 7, 2016, pp. 101-108, XP058081766.

Toon, John, "In Emergencies, Should You Trust a Robot?", Georgia Tech, Feb. 29, 2016, 6 pages, XP055646153.

CA Office Action in Canadian Appln. No. 3,049,726, dated Nov. 8, 2023, 5 pages.

\* cited by examiner

200

```
┌─────────────────────────────────────────────────────────────┐
│ OBTAIN DATA INDICATING A PRESENT EMERGENCY CONDITION WITHIN A│
│ PROPERTY                                                 210 │
└─────────────────────────────────────────────────────────────┘
                              │
                              ▼
┌─────────────────────────────────────────────────────────────┐
│ OBTAIN DATA ASSOCIATED WITH THE PROPERTY                     │
│                                                          220 │
└─────────────────────────────────────────────────────────────┘
                              │
                              ▼
┌─────────────────────────────────────────────────────────────┐
│ OBTAIN DATA INDICATING A LOCATION OF A USER OF THE PROPERTY  │
│                                                          230 │
└─────────────────────────────────────────────────────────────┘
                              │
                              ▼
┌─────────────────────────────────────────────────────────────┐
│ DETERMINE A PATH TO THE USER AND AN EXIT PATH TO GUIDE THE USER│
│ OUTSIDE THE PROPERTY                                     240 │
└─────────────────────────────────────────────────────────────┘
                              │
                              ▼
┌─────────────────────────────────────────────────────────────┐
│ NAVIGATE THE PATH TO THE USER AND THE EXIT PATH              │
│                                                          250 │
└─────────────────────────────────────────────────────────────┘
```

```
┌─────────────────────────────────────────────────────────┐
│ OBTAIN SENSOR DATA FROM ONE OR MORE SENSORS THAT ARE    │
│ LOCATED AT A PROPERTY                                   │
│                                                     410 │
└─────────────────────────────────────────────────────────┘
                            │
                            ▼
┌─────────────────────────────────────────────────────────┐
│ DETERMINE THAT THERE IS AN EMERGENCY CONDITION AT THE   │
│ PROPERTY                                                │
│                                                     420 │
└─────────────────────────────────────────────────────────┘
                            │
                            ▼
┌─────────────────────────────────────────────────────────┐
│ DETERMINE A LOCATION OF A PERSON INSIDE THE PROPERTY    │
│                                                     430 │
└─────────────────────────────────────────────────────────┘
                            │
                            ▼
┌─────────────────────────────────────────────────────────┐
│ DETERMINE A FIRST PATH TO THE PERSON AND A SECOND PATH  │
│ TO GUDIE THE PERSON AWAY FROM THE EMERGENCY CONDITION   │
│                                                     440 │
└─────────────────────────────────────────────────────────┘
                            │
                            ▼
┌─────────────────────────────────────────────────────────┐
│ NAVIGATE THE FIRST PATH TO THE PERSON AND THE SECOND    │
│ PATH TO GUIDE THE PERSON AWAY FROM THE EMERGENCY        │
│ CONDITION                                           450 │
└─────────────────────────────────────────────────────────┘
```

FIG. 4

EMERGENCY DRONE GUIDANCE DEVICE

CROSS-REFERENCE TO RELATED APPLICATIONS

This application is a continuation of U.S. application Ser. No. 17/369,208, filed Jul. 7, 2021, which is a continuation of U.S. application Ser. No. 16/875,293, filed May 15, 2020, now U.S. Pat. No. 11,060,873, issued Jul. 13, 2021, which is a continuation of U.S. application Ser. No. 15/867,175, filed Jan. 10, 2018, now U.S. Pat. No. 10,655,968, issued May 19, 2020, which claims the benefit of U.S. Provisional Patent Application No. 62/444,421, filed on Jan. 10, 2017 and titled "EMERGENCY DRONE GUIDANCE DEVICE." The complete disclosures of all of the above patent applications are hereby incorporated by reference in their entirety for all purposes.

TECHNICAL FIELD

This disclosure relates to home monitoring technology.

BACKGROUND

Property monitoring systems often include sensors and devices that work together to detect conditions such as smoke, fire, carbon monoxides or other emergencies. Detections of emergencies that are present are then used to warn people through visual and audio appliances. Alarms may be activated automatically from smoke detectors or heat detectors, or may also be activated via manual alarm activation devices such as manual call points or pull stations.

SUMMARY

Techniques are described for using a monitoring system to assist users during a detected emergency condition at a property. For example, in response to a monitoring system detecting a fire within a property, a drone device may determine a location of a user who presently occupies the property, and navigate towards the location of the user. The drone device may also determine an optimal exit path that allows a user to quickly exit the property. For example, the drone device may use sensor data obtained from the monitoring system of the property and/or on-board sensor data to identify obstructions within the property in order to determine exit paths that avoid the identified obstructions and present minimal safety risks to the user.

In some implementations, the drone device includes various emergency monitoring and communication features. For example, the drone device may be capable of measuring biometric parameters to determine the user's current state of health. The drone device may also be capable of generating alarm events in response to detecting acute health emergencies from the user's current state of health, or an emergency condition detected by the monitoring system of the property. In other examples, the drone device is capable of updating the alarm status of the property determined by the monitoring system, initiating and transmitting alarm notifications to a central monitoring station, and/or capturing video or audio of all events relating to alarm signal management.

In one general aspect, a system includes one or more computers, and one or more storage devices storing instructions that, when executed by the one or more computers, cause the one or more computers to perform operations. The operations can include: obtaining, by a monitoring system that is configured to monitor a property, sensor data from one or more sensors that are located at the property; based on the sensor data, determining, by the monitoring system, that there is an emergency condition at the property; in response to determining that there is an emergency condition at the property, determining, by the monitoring system and based on the sensor data, a location of a person inside the property; based on the sensor data, the location of the person inside the property, and on characteristics of the property, determining, by the monitoring system, a first path to the person and a second path to guide the person away from the emergency condition; and navigating, by a computing device of the monitoring system, the first path to the person and the second path to guide the person away from the emergency condition.

One or more implementations can include the following optional features. For example, in some implementations, obtaining the sensor data from one or more sensors that are located at the property includes obtaining sensor data representing a physical environment of the property during the emergency condition. In such implementations, determining the second path to guide the person away from the emergency condition further includes the following operations: identifying multiple candidate exit paths based on the physical environment of the property during the emergency condition; determining one or more path metrics associated with each of the multiple candidate exit paths; and selecting, based on the determined path metrics, a particular candidate exit path from among the multiple candidate exit paths as the second path.

In some implementations, each of the multiple candidate exit paths lead to a same exit of the property.

In some implementations, determining the one or more path metrics includes determining a path metric representing a distance of a candidate exit path. In such implementations, the selected candidate exit path has the smallest distance from among the multiple candidate exit paths.

In some implementations, determining the one or more path metrics includes determining a path metric representing a number of obstructions detected along a particular candidate exit path. In such implementations, the selected candidate exit has the lowest number of obstructions from among the multiple candidate exit paths.

In some implementations, determining the one or more path metrics includes determining a path metric representing an estimated time to exit the property by navigating a particular candidate exit path. In such implementations, the selected candidate exit path has the smallest estimated time to exit the property by navigating the selected candidate exit path.

In some implementations, identifying the multiple candidate exit paths based on the physical environment of the property during the emergency condition includes identifying a first candidate exit path and a second candidate exit path. In such implementations, determining the one or more path metrics associated with each of the multiple candidate exit paths includes performing operations for each of the first and second candidate exit paths: determining a first path metric representing a distance of a particular candidate exit path, and determining a second path metric representing a number of obstructions detected along a particular candidate exit path. The operations additionally include determining that the first path metric for the second candidate exit path represents a shorter distance than the first path metric for the first candidate exit path; determining that the second path metric for the first candidate exit path represents a lower number of obstructions detected along the second candidate exit path than the second path metric for the second candidate exit path; and based on determining that the second path metric for the first candidate exit path represents a lower number of obstructions detected along the first candidate exit path than the second path metric for the second candidate exit path, selecting the first candidate exit path as the second path to guide the person away from the emergency condition.

In some implementations, identifying the multiple candidate exit paths based on the physical environment of the property during the emergency condition includes identifying a first candidate exit path and a second candidate exit path. In such implementations, determining the one or more path metrics associated with each of the multiple candidate exit paths includes performing operations for each of the first and second candidate exit paths: determining a first path metric representing a distance of a particular candidate exit path, and determining a second path metric representing a number of obstructions detected along a particular candidate exit path. Additionally, the operations can further include: determining a third path metric representing an estimated time to exit the property by navigating a particular candidate exit path; determining that the first path metric for the second candidate exit path represents a shorter distance than the first path metric for the first candidate exit path; determining that the second path metric for the first candidate exit path represents a lower number of obstructions detected along the second candidate exit path than the second path metric for the second candidate exit path; determining that the third path metric for the first candidate exit path represents a shorter estimated time to exit the property by navigating the first candidate exit path than the third path metric for the second candidate exit path; and selecting the first candidate exit path as the second path to guide the person away from the emergency condition based on (i) determining that the second path metric for the first candidate exit path represents a lower number of obstructions detected along the first candidate exit path than the second path metric for the second candidate exit path and (ii) determining that the third path metric for the first candidate exit path represents a shorter estimated time to exit the property by navigating the first candidate exit path than the third path metric for the second candidate exit path.

In some implementations, the operations further include: determining, by the monitoring system, that the first path is not safe for the person to navigate during the emergency condition; and determining, by the monitoring system, that the second path is safe for the person to navigate during the emergency condition.

In some implementations, the computing device is a drone device.

In some implementations, the operations further include determining the characteristics of the property based on a three-dimensional spatial representation of the property. In such implementations, the three-dimensional spatial representation of the property identifies at least locations of doors of the property and locations of windows of the property.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings.

DESCRIPTION OF DRAWINGS

FIG. 2 illustrates an example of a process for guiding a user outside a property during an emergency condition within the property.

FIG. 4 illustrates an example of a process for determining a path to guide a user away from an emergency condition at a property.

DETAILED DESCRIPTION

Figure 1:
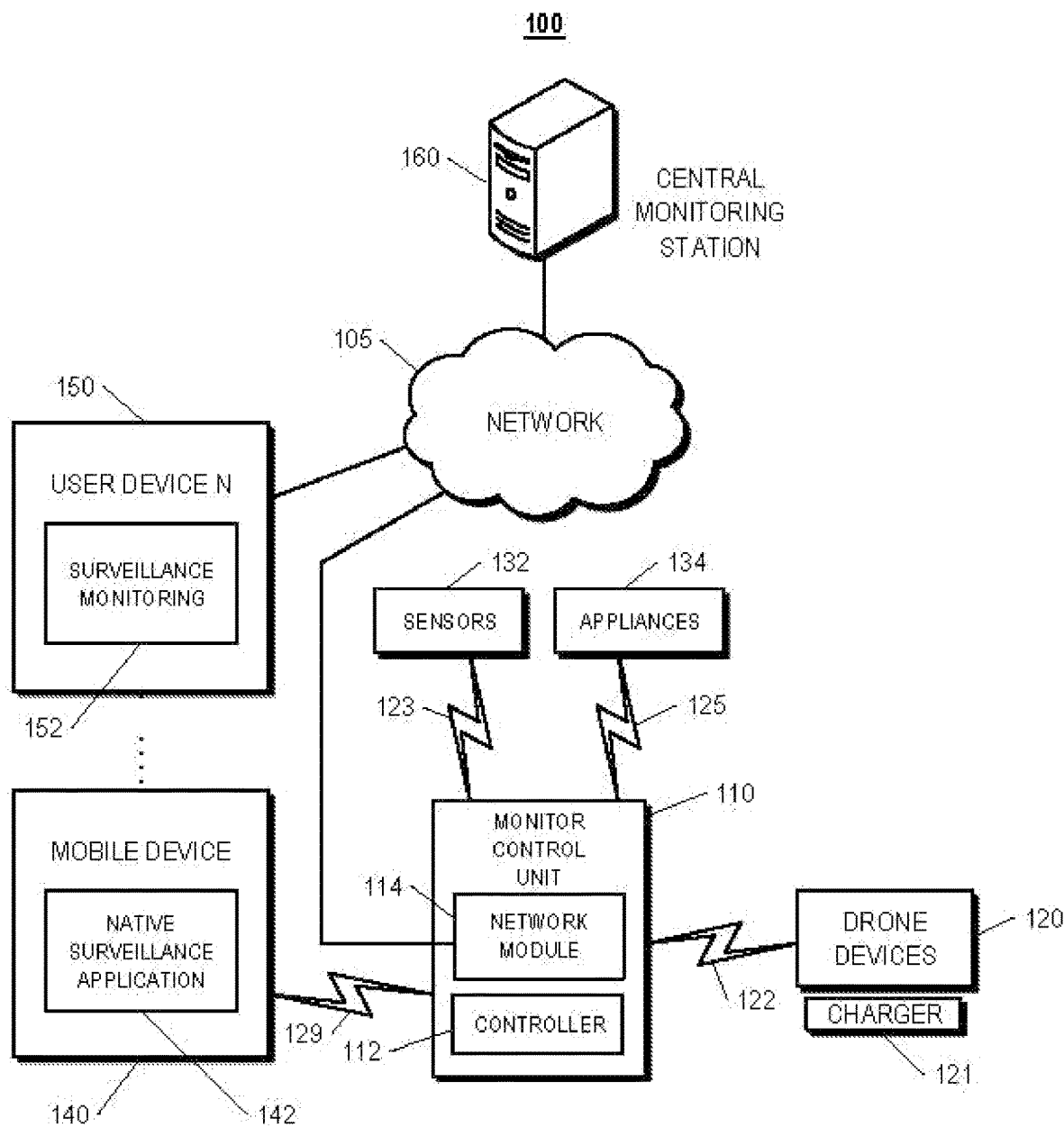
FIG. 1 illustrates a block diagram of an example of a system that is capable of using a drone device to guide a user outside a property during an emergency condition within the property.

In general, techniques are described for using a drone device to assist users during a detected emergency condition at a property. For example, in response to a monitoring system detecting a fire within a property, a drone device may determine a location of a user that presently occupies the property, and navigate towards the location of the user. The drone device may also determine an optimal exit path that allows a user to quickly exit the property. For example, the drone device may use sensor data obtained from the monitoring system of the property and/or on-board sensor data to identify obstructions within the property in order to determine exit paths that avoid the identified obstructions and present minimal safety risks to the user.

In some implementations, the drone device includes various emergency monitoring and communication features. For example, the drone device may be capable of measuring biometric parameters to determine the user's current state of health. The drone device may also be capable of generating alarm events in response to detecting acute health emergencies from the user's current state of health, or an emergency condition detected by the monitoring system of the property. In other examples, the drone device is capable of updating the alarm status of the property determined by the monitoring system, initiating and transmitting alarm notifications to a central monitoring station, and/or capturing video or audio of all events relating to alarm signal management.

The drone device may include features that enable the drone device to interact with a user who presently occupies the property during a detected emergency condition. For instance, the drone device may be capable of receiving a user query related to the property, and in response, parse a collection of stored property information to provide an output responsive to the user query (e.g., speech output, textual display, projection display, etc.). In some instances, the drone device may be capable of dynamically adjusting preconfigured system actions to be performed based on user input received while assisting the user during a detected emergency condition at the property. In this regard, the drone device may be capable to customizing the actions to be performed in response to a detected emergency condition based on the specific conditions of the property and/or the needs of the user.

As described throughout, an "emergency condition" refers to any type of detected condition within the property that triggers an alarm and/or security signal by a monitoring system of the property. Examples of detected emergency conditions include excessive heat detected by a heat detector or smoke detected by a smoke detector indicating a potential fire within the property, high amounts of carbon monoxide detected by a carbon monoxide detector indicating potential air toxicity within the property, an intrusion detected by motion sensors indicating a security breach within the property, among others. An emergency condition may be detected by any suitable component of a monitoring system within a property. In some instances, the emergency condition is detected locally by a component located within the property (e.g., a monitor control unit, a sensor, or an appliance). Additionally, or alternatively, the emergency condition can also be detected remotely by a central monitoring station that exchanges data communications with a monitor control unit placed within a property.

As described throughout, a "user" (or an "occupant") refers to an individual that presently occupies a property when an emergency condition is detected within the property. For example, a user can be a long-term user associated with the property (e.g., a tenant, a property owner, etc.), a short-term guest that visits the property, or any other type of individual that may be located within the property for a period of time. In some instances, a user can be an individual who is predicted to be in the property based on the information available to a monitoring system but is not actually in the property when the emergency condition is detected. For example, a monitoring system may predict that the user presently occupies the property based on his/her most recent activity even though he/she has since left the property.

FIG. 1 illustrates an example of a system 100 that is capable of using a drone device to guide a user outside a property during an emergency condition at the property. The system 100 includes a monitor control unit 110, a drone device 120, sensors 132, appliances 134, user devices 140, 150, and a central monitoring station 160 connected over a network 105 within a property.

In general, the system 100 uses the drone device 120 to provide assistance to a user that occupies a property when an emergency condition is detected within the property. For example, in response to obtaining data indicating a detected emergency condition, the drone device 120 may identify a location of the user within the property. The drone device 120 may also determine a path to the location of the user, and an exit path from the location of the user to a suitable entrance/exit of the property. The drone device 120 may then navigate to the location of the user within the property. Once the drone device 120 reaches the user's location, the drone device 120 may guide the user through an exit path to safely navigate through and exit the property.

Referring now to the components of system 100, the network 105 is configured to enable exchange of electronic communications between devices connected to the network 105. For example, the network 105 may be configured to enable exchange of electronic communications between the monitor control unit 110, the drone device 120, the sensors 132, the appliances 134, the user devices 140, 150, and the central monitoring station 160.

The network 105 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 105 may include multiple networks or subnetworks, each of which may include, for example, a wired or wireless data pathway.

The network 105 may include a circuit-switched network, a packet-switched data network, or any other network able to carry electronic communications (e.g., data or voice communications). For example, the network 105 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 105 may include one or more networks that include wireless data channels and wireless voice channels. The network 105 may be a wireless network, a broadband network, or a combination of networks including a wireless network and a broadband network.

The monitor control unit 110 includes a controller 112 and a network module 114. The controller 112 is configured to control a monitoring system (e.g., a home alarm or security system) that includes the drone device 120. In some examples, the controller 112 may include a processor or other control circuitry configured to execute instructions of a program that controls operation of an alarm system. In these examples, the controller 112 may be configured to receive input from sensors, detectors, or other devices included in the alarm system and control operations of devices included in the alarm system or other household devices (e.g., a thermostat, an appliance, lights, etc.). For example, the controller 112 may be configured to control operation of the network module 114 included in the drone device 120.

The network module 114 is a communication device configured to exchange communications over the network 105. The network module 114 may be a wireless communication module configured to exchange wireless communications over the network 105. For example, the network module 114 may be a wireless communication device configured to exchange communications over a wireless data channel and a wireless voice channel. In this example, the network module 114 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 114 also may be a wired communication module configured to exchange communications over the network 105 using a wired connection. For instance, the network module 114 may be a modem, a network interface card, or another type of network interface device. The network module 114 may be an Ethernet network card configured to enable the drone device 120 to communicate over a local area network and/or the Internet. The network module 114 also may be a voice band modem configured to enable the alarm panel to communicate over the telephone lines of Plain Old Telephone Systems (POTS).

The drone device 120 may be an unmanned device that is capable of movement through a property to assist a user that is presently located within property during a detected emergency condition. For example, the drone device 120 may be capable of moving throughout a property based on automated control technology and/or input control provided by either the user or by the central monitoring station 160. In such an example, the drone device 120 may be able to fly, roll, walk, or otherwise move about the property.

The drone device 120 may include helicopter type devices (e.g., quad copters), rolling helicopter type devices (e.g., roller copter devices that can fly and also roll along the grounds, walls, or ceiling), land vehicle type devices (e.g., automated cars that drive around a property), and plane type devices (e.g., unmanned aircraft). In some instances, the drone device 120 may be robotic devices that are intended for other purposes and merely associated with the system 100 for use in appropriate circumstances. For instance, a security drone may be associated with the system 100 as the drone device 120 and may be controlled to take action responsive to system events.

The drone device 120 can be configured to automatically navigate within a property. For instance, the drone device 120 may include sensors and control processors that guide movement of the drone device 120 within the property. The drone device 120 may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The drone device 120 may include control processors that process output from the various sensors and control the drone device 120 to move along a path that reaches the desired destination and avoids obstacles. In this regard, the control processors detect walls or other obstacles in the property and guide movement of the drone device 120 in a manner that avoids the walls and other obstacles.

In addition, the drone device 120 may store data that describes attributes of the property. For instance, the drone device 120 may store a floorplan and/or a three-dimensional model of the property that enables the drone device 120 to navigate the property. During initial configuration, the drone device 120 may receive the data describing attributes of a property, determine a frame of reference to the data (e.g., a home or reference location in the property), and navigate a property based on the frame of reference and the data describing attributes of a property.

Further, initial configuration of the drone device 120 also may include learning of one or more navigation patterns in which a user or a system administrator provides input to control the drone device 120 to perform a specific navigation action (e.g., fly to an upstairs bedroom and spin around while capturing video and then return to a home charging base). In this regard, the drone device 120 may learn and store the navigation patterns such that the drone device 120 may automatically repeat the specific navigation actions when instructed to assist a user during a detected emergency condition at the property.

In some implementations, the drone device 120 may include data capture and recording devices. In these examples, the drone device 120 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property and users in the property.

In some implementations, the drone device 120 may include output devices. In these implementations, the drone device 120 may include one or more displays, one or more speakers, one or more projectors, and/or any type of output devices that allow the drone device 120 to communicate information to a nearby user. The one or more projectors may include projectors that project a two-dimensional image onto a surface (e.g., wall, floor, or ceiling) and/or holographic projectors that project three-dimensional holograms into a nearby space.

The drone device 120 also may include a communication module that enables the drone device 120 to communicate other devices of the system 100. The communication module may be a wireless communication module that allows the drone device 120 to communicate wirelessly. For instance, the communication module may be a Wi-Fi module that enables the drone device 120 to communicate over a local wireless network at the property. The communication module further may be a 900 MHz wireless communication module that enables the drone device 120 to communicate directly with the monitor control unit 110. Other types of short-range wireless communication protocols, such as Bluetooth, Bluetooth LE, Z-wave, ZigBee, etc., may be used to allow the drone device 120 to communicate with other devices in the property.

The drone device 120 further may include processor and storage capabilities. The drone device 120 may include any suitable processing devices that enable the drone device 120 to operate applications and perform the actions described throughout this disclosure. In addition, the drone device 120 may include solid state electronic storage that enables the drone device 120 to store applications, configuration data, collected sensor data, and/or any other type of information available to the drone device 120.

The drone device 120 may be associated with a charging station 121. The charging station 121 may be located at a predefined or reference location within a property. The drone device 120 may be configured to navigate to the charging station 121 after successfully navigating the user through an exit path outside of the property. For instance, after completing the navigation through the exit path or upon instruction by the monitor control unit 110, the drone device 120 may be configured to automatically fly to and land on one of the charging station 121. In this regard, the drone device 120 may automatically maintain a fully charged battery in a state in which the drone device 120 are ready for use by the system 100.

The charging station 121 may be a contact-based charging stations and/or wireless charging stations. For contact based charging stations, the drone device 120 may have readily accessible points of contact that the drone device 120 are capable of positioning and mating with a corresponding contact on the charging station 121. For instance, a helicopter type robotic device may have an electronic contact on a portion of its landing gear that rests on and mates with an electronic pad of a charging station 121 when the helicopter type robotic device lands on the charging station 121. The electronic contact on the robotic device may include a cover that opens to expose the electronic contact when the robotic device is charging and closes to cover and insulate the electronic contact when the robotic device is in operation.

For wireless charging stations, the drone device 120 may charge through a wireless exchange of power. In these cases, the drone device 120 need only locate themselves closely enough to the wireless charging stations for the wireless exchange of power to occur. In this regard, the positioning needed to land at a predefined home base or reference location in the property may be less precise than with a contact-based charging station. Based on the drone device 120 landing at a wireless charging station, the wireless charging station outputs a wireless signal that the drone device 120 receive and convert to a power signal that charges a battery maintained on the drone device 120.

As described above, the drone device 120 may exchange communications with the monitor control unit 110, the sensors 132, the appliances 134, the user devices 140, 150, and the central monitoring station 160 over the network 105 or any other suitable communication means. For example, the drone device 120 may utilize a wireless data pathway 122 configured to transmit signals from the monitor control unit 110, the sensors 132, the appliances 134, the user devices 140, 150, and the central monitoring station 160 to a controller 112. The monitor control unit 110, the sensors 132, the appliances 134, the user devices 140, 150, and the central monitoring station 160 may continuously transmit sensed values to the controller 112, periodically transmit sensed values to the drone device 120, or transmit sensed values to the drone device 120 in response to a change in a sensed value.

In some implementations, the drone device 120 may additionally be used to perform routine surveillance operations on a property. For instance, the drone device 120 may be assigned to one or more particular properties within a geographic location and may routinely collect surveillance footage during specified time periods (e.g., after dark), which may then be transmitted to the central monitoring station 160 for transmitting back to each particular property owner. In such implementations, the property owner may receive the surveillance footage over the network 105 as a part of a service provided by a security provider that operates the central monitoring station 160. For example, transmissions of the surveillance footage collected by the drone device 120 may be part of a premium security service package provided by a security provider in addition to the routine drone emergency response service.

In some implementations, the drone device 120 may monitor the operation of the monitor control unit 110, the sensors 132, the appliances 134, the user devices 140, 150, and/or the central monitoring station 160. For instance, the drone device 120 may enable or disable the devices located within a property based on a set of rules associated with energy consumption, user-specified settings, and/or other information associated with conditions prior to, during, or after navigation through the exit path.

In some implementations, the drone device 120 may be used as a replacement to a traditional security panel (e.g., the monitor control unit 110) that is used to monitor and control the operations of the system 100. In other examples, the drone device 120 may coordinate monitoring operations with a separate security panel of the system 100. In such examples, the drone device 120 may monitor particular activities of the devices of the system 100 that are not monitored by the security panel, or monitor the operation of particular devices that are not monitoring by the security panel.

In some implementations, the drone device 120 is configured and managed by a service provider entity associated with the central monitoring station 160. In such implementations, the drone device 120 may be provided as device component of the system 100 when the sensors 132 and/or the monitor control unit 110 is installed within a property. Alternatively, in other implementations, the drone device 120 may be an after-market device that is configured to exchange data communications with components of the system 100 (e.g., the monitor control unit 110, the sensors 132, and/or the appliances 134) when the system 100 is already installed within the property. In this regard, the drone device 120 may be a device from the system 100 this is configured to perform the operations described throughout.

The system 100 also includes one or more sensors or detectors. For example, the system 100 may include multiple sensors 132. The sensors 132 may include a contact sensor, a motion sensor, a glass break sensor, or any other type of sensor included in an alarm system or security system. The sensors 132 also may include an environmental sensor, such as a temperature sensor, a water sensor, a rain sensor, a wind sensor, a light sensor, a smoke detector, a carbon monoxide detector, an air quality sensor, etc. The sensors 132 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 132 may include a radio-frequency identification (RFID) sensor that identifies a particular article that includes a pre-assigned RFID tag.

In some implementations, the sensors 132 may include one or more cameras. The cameras may be video/photographic cameras or other type of optical sensing devices configured to capture images. For instance, the cameras may be configured to capture images of an area within a building monitored by the monitor control unit 110. The cameras may be configured to capture single, static images of the area and also video images of the area in which multiple images of the area are captured at a relatively high frequency (e.g., thirty images per second). The cameras may be controlled based on commands received from the monitor control unit 110.

The appliances 134 may be home automation devices connected to the network 105 that are configured to exchange electronic communications with other devices of the system 100. The appliances 134 may include, for example, connected kitchen appliances, controllable light sources, safety and security devices, energy management devices, and/or other types of electronic devices capable of exchanging electronic communications over the network 105. In some instances, the appliances 134 may periodically transmit information and/or generated data to the monitor control unit 110 such that the monitor control unit 110 can automatically control the operation of the appliances 134 based on the exchanged communications. For example, the monitor control unit 110 may operate one or more of the appliances 134 based on a fixed schedule specified by the user. In another example, the monitor control unit 110 may enable or disable one or more of the appliances 134 based on received sensor data from the sensors 132.

The user devices 140, 150 may be any type of personal electronic computing device that is associated with users that reside within a property (e.g., a tenant, temporary visitor, guest, etc.). The user devices 140, 150 may be one or more of a cellular telephone, smartphone, a tablet computing device, a laptop computing device, a desktop computing device, a wearable device, or any other type of network-enabled electronic device.

The user devices 140, 150 may include native applications 142 and 152 that enable communications with devices located within a property through the central monitoring station 160. The native applications 142, 152 refer to software/firmware programs running on the user devices 140, 150 that enable various features. For instance, the user devices 140, 150 may load or install the native application based on data received over a network 105 or data received from local media. The native applications 142, 152 may run on mobile devices' platforms, such as Apple iOS, iPhone, iPod touch, Blackberry, Google Android, Windows Mobile, etc.

In some implementations, the native applications 142, 152 of the user devices 140, 150 identify a geographic location associated with the user devices 140, 150 and communicate information identifying the geographic location. For example, the user devices 140, 150 having the native applications 142, 152 may determine a geographic location of the user devices 140, 150 using GPS capabilities, and may communicate data identifying the geographic location to the central monitoring station 160. In some instances, the native application may check the location of the user devices 140, 150 periodically and may detect when a user is presently located inside or outside a property. Location data associated with the user devices 140, 150 can then be used by the drone device 120 to determine the region of the property where the user is located during an emergency incident within the property.

Additionally, or alternatively, the user devices 140, 150 may communicate with the monitor control unit 110 and/or the drone device 120 using various local wireless protocols, such as Wi-Fi, Bluetooth, Z-Wave, ZigBee, Home Plug, HPAV, HPAV2, G.hn (Ethernet over power line), or wired protocols such as Ethernet, USB, and other wired protocols based on the RS232, RS485, and/or RS422 standards.

The central monitoring station 160 may be an electronic device configured to provide monitoring services by exchanging electronic communications with the monitor control unit 110, the drone device 120, the sensors 132, the appliances 134, and the user devices 140, 150 over the network 105.

The central monitoring station 160 may be configured to monitor events (e.g., alarm events, emergency conditions, etc.) generated by the monitor control unit 110 and/or the drone device 120. For example, the central monitoring station 160 may exchange electronic communications with the network module 114 included in the monitor control unit 110 to receive information regarding events (e.g., fire, carbon monoxide) detected by the monitor control unit 110. The central monitoring station 160 also may receive information regarding events (e.g., alarm events) from the drone device 120.

The central monitoring station 160 may store sensor and image data received from the system 100 and perform analysis of sensor and image data received from the system 100. Based on the analysis, the central monitoring station 160 may communicate with and control aspects of the monitor control unit 110 or the one or more user devices 140, 150.

FIG. 2 illustrates an example of a process 200 for guiding a user outside a property during an emergency condition within the property. The process 200 may include obtaining data indicating a present emergency condition within a property (210), obtaining data associated with the property (220), obtaining data indicating a location of a user of the property (230), determining a path to the user and an exit path to guide the user outside the property (240), and navigating the path to the user and the exit path (250).

In more detail, the process 200 may include obtaining data indicating a present emergency condition within a property (210). For instance, the drone device 120 may obtain data indicating an emergency condition within a property from the monitor control unit 110. As described above, an emergency condition can be detected based on sensor data collected by one or more of the sensors 132 (e.g., excessive smoke detected by a smoke sensor, excessive heat detected by a heat sensor, toxic levels of carbon monoxide detected by a carbon monoxide sensor, and/or unauthorized motion detected by a motion sensor). In some implementations, instead of routing collected sensor data through the monitor control unit 110, the drone device 120 may obtain collected sensor data directly from the sensors 132 over, for example, the network 105.

In some implementations, instead of obtaining data indicating a present emergency condition within the property, the drone device 120 can detect the emergency condition based on data collected by on-board sensors that are not included within the sensors 132. For example, the drone device 120 may include an on-board heat sensor, smoke sensor, and other types of sensors, that are capable of monitoring the conditions of the property in parallel with the sensors 132 and/or the appliances 134. In such implementations, once the drone device 120 detects a present emergency condition based on its collected on-board data, a communication signal indicating the detected emergency condition can be transmitted to the monitor control unit 110, the user devices 140, 150, and/or the central monitoring station 160.

The process 200 may include obtaining data associated with the property (220). For instance, the drone device 120 may obtain data from the components of the system 100 that indicate present conditions within the property. For instance, as described above, the obtained data may include sensor data collected by the sensors 132 (e.g., motion detection events, changes in ambient temperature, etc.), operation data associated with the appliances 134 (e.g., recently applied device settings, last time point of usage, etc.), among other types of property-related data.

In some implementations, in response to obtaining data indicating a present emergency condition within the property, the drone device 120 may quickly survey regions of the property to identify any risk conditions and/or obstructions that may endanger the user that presently resides within the property. For example, the drone device 120 may navigate to all known entrances/exits of the property to ensure that the user is able to safely exit through the property.

The process 200 may include obtaining data indicating a location of a user of the property (230). For instance, the drone device may obtain location data from the user device 140 indicating a location of the user within the property. In some instances, the drone device 120 may determine a location of the user based on exchanging short-range communications with a user device associated with the user (e.g., Bluetooth, near-field communication, infrared communication, etc.). For example, the drone device 120 may ping the user device 140 in order to identify a location of the user device 140, which can then be used to identify an associated location of the user.

In other instances, the drone device 120 may also determine a location of the user based on identifying a last known location of the user based on sensor data collected by the sensors 132 or on-board sensors of the drone device 120. For example, if a user was last detected in a bedroom, the drone device 120 may navigate to the bedroom and then determine if the user is presently located in the last known location. In other instances, the drone device 120 may use a combination of techniques described above as well as visual scanning techniques to identify a location of the user. For example, the drone device 120 may scan regions of the property to identify a location where a user is detected.

In some instances, the drone device 120 may predict that a user presently occupies a property based on prior user activity data even though he/she has actually left the property. In such instances, the drone device 120 may initially navigate to the last known location associated with the user indicated by the user activity data. The drone device 120 may then perform a surveying operation to search for the user in other regions of the property. Alternatively, the drone device 120, upon being unable to identify the user within the property, may also initiate communications with the user devices 140, 150 that were recently detected within the property. In other instances, the drone device 120 may initiate communications with an authorized caretaker and/or an emergency contact associated with the user to verify that the user has actually left the property.

The process 200 may include determining a path to the user and an exit path to guide the user outside the property (240). For instance, as described above, the drone device 120 may initially survey the property to determine if there are any regions/locations of the property with obstructions that may impede the user's movement through the property. The drone device 120 may then determine a path to the user and an exit path that avoids the identified obstructions. In some implementations, the drone device 120 may identify different alternative paths between two locations of the property using stored navigation and/or topographical data associated with the property.

For example, for a path to the user, the drone device may determine alternative paths between a starting point represented by an initial location of the drone device 120 and an ending point represented by the location of the user within the property. In another example, for an exit path, the drone device may determine alternative paths between a starting point represented by the location of the user within the property and an ending point represented by an exit to the outside of the property. Examples of alternative exit paths are depicted in FIG. 3.

The process 200 may include navigating the path to the user and the exit path (250). For instance, after determining the path to the user and the exit path to guide the user outside the property, the drone device 120 may navigate between the starting point and the ending point of each path along a particular pathway. As described above, the particular pathway for each path may be selected to avoid detected obstructions that may impede the user's movement and/or the movement of the drone device 120 between the starting point and the ending point of the corresponding path.

In some implementations, the drone device 120 may include various user interaction or assistance features for helping the user to navigate through the property along the exit path. For instance, the drone device 120 may include a flash light that illuminates the pathway along the exit path when the property loses power or there is limited visibility along the pathway. In other instances, the drone device 120 may provide instructions that inform the user to make certain movements to improve the speed of navigation along the exit path. For example, the drone device 120 may provide information relating to the location of obstructions relative to the location of the user, the region of the property where the user is presently located, among others. In other instances, the drone device 120 may accept various types of user input from the user (e.g., speech queries, text queries, etc.) and then perform real-time actions responsive to the received user input. For example, the drone device 120 may enable the user to place voice or video calls to emergency contacts, transmit alert notifications to first responders and/or law enforcement agencies, or request information related to the current condition of the property.

Figure 3:
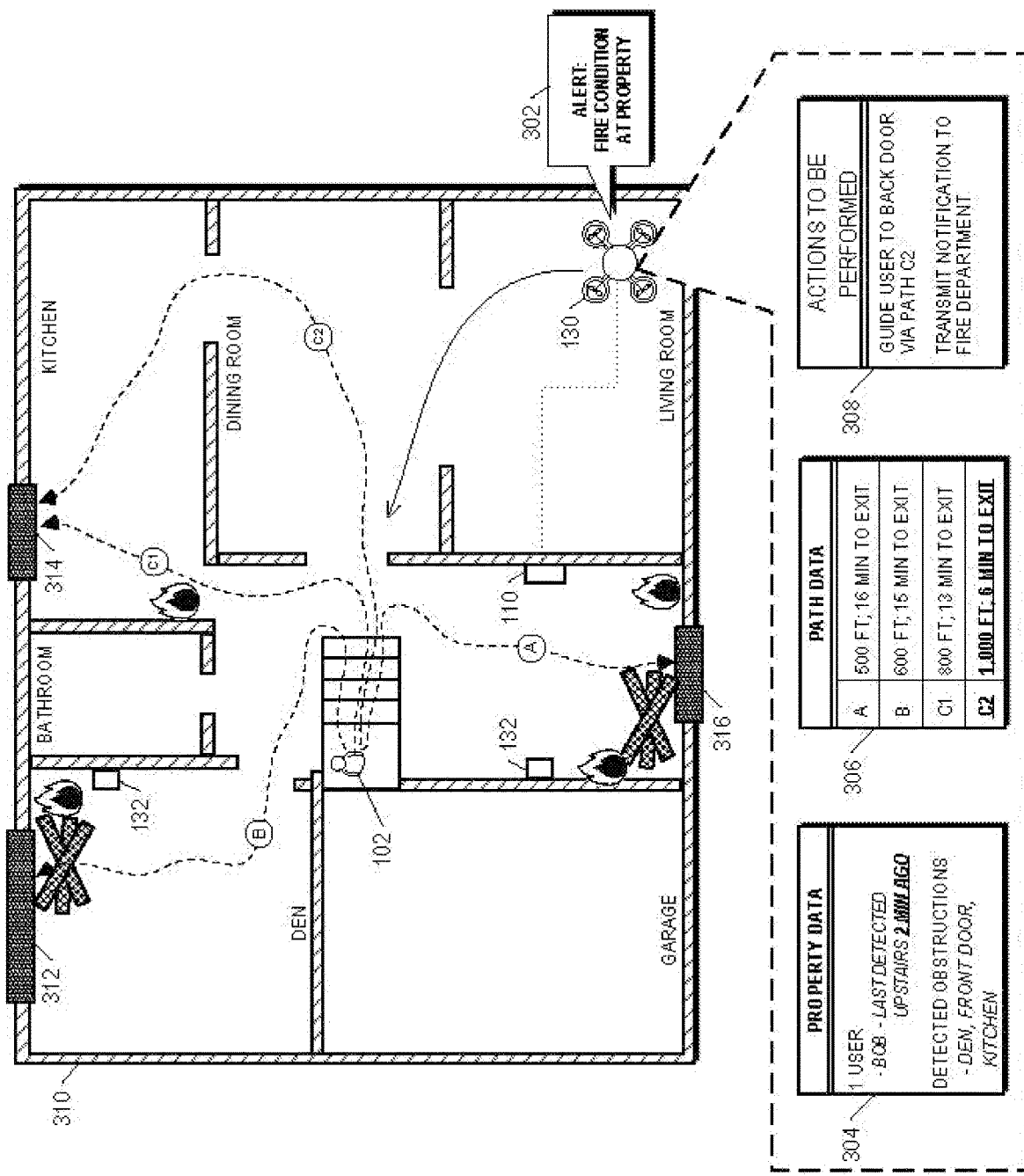
FIG. 3 illustrates a top view of a property where a drone navigates to a path to the user and an exit path during an emergency condition within the property.

FIG. 3 illustrates a top view of a property 310 where the drone device 120 navigates to a path to a user 102 and an exit path during an emergency condition within the property 310. In the example depicted, the system 100 detects a fire within the property 310. Data indicating the detected fire is then transmitted to the drone device 120. The drone device 120 then proceeds to execute the following steps: (1) obtaining data indicating a detected emergency condition within the property 310, (2) obtaining data associated with the property 310, (3) obtaining data indicating a location of the user 102, (4) determining a path to the user 102 and an exit path to guide the user outside the property 310, and (5) navigating the path to the user and the exit path.

Referring now to the example depicted in the figure, at step (1), the drone device 120 initially obtains an alert notification 302 indicating that a fire condition has been detected at the property 310. As described above, this emergency condition may be detected based on data collected by one or more of the sensors 132 indicating excessive heat or smoke produced within the property 310. Additionally, or alternatively, sensor data can also be collected by on-board sensors of the drone device 120. In such implementations, the drone device 120 can also detect the emergency condition and notify the monitor control unit 110 and/or the central monitoring station 160 of the detected alarm condition.

At step (2), the drone device 120 uses various types of data to assist the user 102 during an emergency condition detected within the property 310. As depicted, the drone device 120 may obtain property data 304, which includes information about a number of users that presently occupy the property 310 when the emergency condition is detected at the property 310, and a set of identified obstructions within the property. As described above, in some implementations, drone device 120 may identify the obstructions based on data collected by the sensors 132. In other implementations, the drone device 120 can instead identify the obstructions based on an initial surveying operation in response to receiving the alert notification 302 indicating the detected emergency condition within the property 310. In other implementations, a combination of techniques may be used to identify the obstructions within the property 310.

In the example depicted in the figure, the obtained property data 304 indicates that there is one user that is currently inside the property and that the user was last detected to be upstairs two minutes ago. The property data 304 also indicates that three obstructions have been detected within the property (e.g., in the den, at the front door, and in the kitchen). These obstructions resulted from property damage caused by the fire detected within the property 310.

At step (3), the drone device 120 obtains data indicating the location of the user 102 that is presently located within the property. As described above, in some implementations, the location of the user 102 is determined based on motion or presence data collected by the sensors 132. In such implementations, the location of the user 102 is determined based on sensor data indicating the last known or detected location of the user 102 by the sensors 132. In other implementations, the location of the user 102 may be determined inferentially based on the location of an associated user device (e.g., the user device 140). In such implementations, the drone device 120 may ping the user device 140 using any suitable wireless communication protocol (e.g., Bluetooth, IR, NFC, etc.) to identify its location. In other implementations, a combination of techniques may be used to identify different candidate locations within the property 310 where the user 102 may be located.

At step (4), the drone device 120 determines a path to the user 102 and an exit path to guide the user 102 outside the property 310. As described above, for each path, the drone device 120 initially identifies a starting and an exit point, computes one or more pathways between the starting and exiting point, and then computes a set of path metrics, which are represented in path data 306. In some implementations, as depicted in the figure, the drone device 120 may compute alternative paths as well as alternative pathways for a particular path.

In the example depicted in the figure, the drone device 120 calculates alternative exit paths, denoted as "A," "B," "C1," and "C2," which are each defined by unique pathways from a shared starting point (e.g., the identified location of the user 102 within the property 310) and divergent exiting points (e.g., through the front door 316, the back door 312, and the back door 314). The path data 306 includes a set of path metrics such as a distance of the exit path, and an estimated to time for the user 102 to navigate to the outside of the property. In other implementations, other path metrics such as pathway difficulty may also be calculated by the drone device 120.

Once the drone device 120 computes the alternative paths and path metrics for each alternative path, the drone device 120 then selects a particular path as the exit path to guide the user 102 outside the property 310. In the example, the drone device 120 selects path C2 as the exit path based on estimating that this path will be the quickest to allow the user 102 to exit the property 310. This determination may be based on, for example, whether a pathway of a particular route includes a detected obstruction, an overall distance of the path through the property, and a difficultly associated with navigating through the path. For instance, although path C2 is the longest path of all of the alternative paths, the drone device 120 estimates the shortest travel time based on the other alternative paths having one or more obstructions along their respective pathways. In this example, the drone device 120 therefore selects the path C2 as the exit path in order to help the user 102 avoid obstructions within the property 310 while also exiting the property 310 in the shortest time period.

At step (5), after the drone device 120 determines a path to the user 102 and the exit path, the drone device 120 then navigates the selected path to the user 102 and the selected exit path. For instance, after locating the user 102 within the property 310, the drone device 120 then provides instructions to the user 102 to follow the drone device 120 along the pathway of the selected exit path.

As described above, in some implementations, the drone device 120 provides communication and navigational assistance to the user 102 as he/she is navigating through the pathway of the selected exit path. For example, the drone device 120 can provide illumination to improve the user's visibility along the pathway, provide audible sounds or noises to direct the user along the pathway, or provide audible or visible movement directions, among others. The drone device 120 may also allow the user 102 to make video or audio calls to authorized caretakers or emergency contacts.

In some implementations, the drone device 120 may be capable of performing real-time path adjustments as the user is traveling along a selected exit path. The drone device 120 may perform path adjustment based on, for example, changing conditions within the property 101, user activity detected along the pathway of the selected exit path, or other detected data indicating changed circumstances that impact the user's ability to exit the property. For example, if the drone device 120 detects that the user 102 is having difficulty traversing a particular point of selected exit path, the drone device 120 may compute alternative pathways to automatically re-route the user to avoid the particular point where the user 102 is having difficulty. In another example, if a new obstruction is detected along a pathway of a selected exit path, the drone device 120 may repeat the path calculation techniques described above to determine a new exit path for the user 102.

In addition to assisting the user 102 to navigating along the pathway of the selected exit path, the drone device 120 may also perform other actions. For example, as illustrated in the figure, the drone device 120 may obtain a list 308 that specifies actions to be performed concurrently with or after navigating the user 102 outside the property. For example, the drone device 120 transmit alert notifications indicating the detected emergency condition to emergency responders or law enforcement agencies.

FIG. 4 illustrates an example of a process 400 for determining a path to guide a user away from an emergency condition at a property. Briefly, the process 400 can include the operations of obtaining sensor data from one or more sensors that are located at a property (410), determining that there is an emergency condition at the property (420), determining a location of a person inside the property (430), determining a first path to the person and a second path to guide the person away from the emergency condition (440), and navigating the first path to the person and the second path to guide the person away from the emergency condition (450).

In general, the operations of the process 400 are described below in reference to the system 100, although any property management system can be configured to perform such operations. In some implementations, the operations are performed by a single component of the system 100, such as the monitor control unit 110 or the central monitoring station 160. In other implementations, the operations are performed by multiple components of the system 100. For example, the monitor control unit 110 can collect and process sensor data collected by the sensors 132 and provide the processed sensor data to the central monitoring station 160, when determines that an emergency condition has taken place in the property. In response, the drone device 120 can then identify a location of the user within the property, identify a suitable exit path for navigating the user to an exit of the property during the emergency condition, and navigate to the user through the exit path.

In more detail, the process 400 can include the operation of obtaining sensor data from one or more sensors that are located at a property (410). For example, the system 100 can obtain sensor data collected by the sensors 132 that are located in a property that is monitored by the system 100. As discussed above, the sensor data can include various types of property data that can be used to determine a present condition of the property. In the example depicted in FIG. 3, the sensor data includes ambient temperature and occupancy data of the property 310. The sensor data can also indicate the operating status and/or configurations of devices and/or property features, e.g., whether doors/windows of the property 310 are open or closed, or devices that are turned on or off.

The process 400 can include the operation of determining that there is an emergency condition at the property (420). For example, the system 100 can determine that there is an emergency condition at the property based on the sensor data. As discussed above, the emergency condition can represent a fire detected within the property, or any other property condition that is hazardous to users located within the property and may require exiting the property. In the example depicted in FIG. 3, the system 100 determines that there is a fire in the property 310 based on sensor data collected by the sensors 132, which indicates an abnormally high ambient temperature within the property, e.g., 98 degrees Fahrenheit.

The process 400 can include the operation of determining a location of a person inside the property (430). For example, the system 100 can determine a location of the user within the property in response to determining that there is an emergency condition at the property. The location of the user can be determined based on the sensor data. In the example depicted in FIG. 3, the location of the user 102 within the property 310 is determined based on occupancy data specifying a last known location of the user 102 within the property data 304. In some other instances, the location of the user 102 within the property 310 can be determined based on monitoring a signal associated with a device of the user 102, such as the mobile device 140.

The process 400 can include the operation of determining a first path to the person and a second path to guide the user away from the emergency condition (440). For instance, in the example depicted in FIG. 3, the drone device 130 can determines a first path to the user 102 and a second path to guide the user 102 toward an exit of the property 310. As discussed above, the first and second paths can be determined based on the sensor data collected by the sensors 132, the location of the user 102 inside the property 310, and based on characteristics of the property 310. The characteristics of the property 310 can be identified based on a three-dimensional spatial model of the property 310 that specifies locations of property features such as windows, doors, entrances, hallways, rooms, among others.

The first and second paths can be determined to reduce the time needed to navigate the user 102 out of the property 310 and/or minimize safety risks associated with navigation. For example, the drone device 130 can identify multiple candidate paths to the user 102 and multiple candidate exit paths to an exit of the property 310. In such examples, the drone device 130 selects a suitable path from among the multiple candidate paths based on computed path metrics. As discussed above, the path metrics can represent a time needed for the drone device 130 and/or the user 102 to navigate a certain path, a distance of the certain path, a number of obstructions detected along or nearby the certain path, among other features.

As depicted in FIG. 3, the system 100 can determine multiple candidate exit paths for navigating the user away from a detected emergency condition at a property. In the example depicted in FIG. 3, the system 100 obtains sensor data collected by the sensors 132 that collectively represent a physical environment of the property during a detected emergency condition. For instance, the property data 304 can include a three-dimensional spatial model of the property 310 that identifies locations of doors, windows, and other exit points through which the user 102 can exit the property 310. In this example, the system 100 determines the second path to guide the person away from the emergency condition by initially generating path data 306. The path data 306 includes multiple candidate exit paths A, B, C1, and C2, which are identified based on the physical environment of the property during the emergency condition. The system 100 determines one or more path metrics associated with each of the multiple candidate exit paths A, B, C1, and C2, such a distance to an exit point of the property 310, and an estimated time point for navigating each path. The system 100 selects one of the candidate exit paths as the second path based on the determined path metrics. For instance, in the example depicted in FIG. 3, the system 100 selects candidate exit path C2 because it is determined to have a path metric that represents the shortest time to navigate to an exit of the property 310.

In some instances, each of the multiple candidate exit paths lead to a same exit path of a property. In the example depicted in FIG. 3, candidate exit paths C1 and C2 both lead to back door 314 of the property 310. In other instances, each of the multiple candidate exit paths lead to a same exit path of a property. For example, as depicted in FIG. 3, candidate exit path A leads to front door 316 of the property whereas candidate exit path B leads to back door 312 of the property 310.

As discussed above, the system 100 can determine various path metrics that represent attributes of exit paths to navigate a user to an exit of a property. As one example, the system 100 determines one type of path metric that represents a distance of a candidate exit path, e.g., a distance from a location of a user within the property and an exit through which the user can vacate the property. In some instances, the system 100 selects a particular candidate path that has the smallest distance from among the multiple candidate exit paths as the second path to guide the person away from the emergency condition.

As another example, the system 100 can determine another type of path metric that represents a number of obstructions detected along a particular candidate exit path, e.g., objects detected along or nearby an exit path that may prevent a user from navigating the path to a designated exit. In some instances, the system 100 selects a particular candidate path that has the smallest number of detected obstructions from among the multiple candidate exit paths as the second path to guide the person away from the emergency condition.

As yet another example, the system determines another type of patch metric that represents an estimated time to exit the property by navigating a particular candidate exit path. In some instances, the system 100 selects a particular candidate path that has the smallest estimated time to exit the property by navigating the selected candidate exit path.

As discussed above, the system 100 can select the second path to maximize the safety of the user even if different path metrics provide somewhat conflicting information. For example, as shown in FIG. 3, the system 100 selects the candidate exit path C2 as the second path over the candidate exit path C1 even though the candidate exit path C2 has a longer distance to the back door 314. In this example, the system 100 selects the longer exit path because the candidate exit path C1 has a smaller number of detected obstacles along it, which the system 100 predicts will take the user 102 less time to navigate to the back door 314 compared to navigating along the candidate exit path C2. In another example, when selecting from among the multiple candidate exit paths, the system 100 prioritizes the safety of the user regardless of the time required to navigate. In this example, the system 100 can determine a severity associated with a detected obstruction along a candidate exit path, and for instance, avoid selecting candidate exit paths that have severe obstructions, e.g., fires, broken structures, debris, or other obstructions that may pose safety risks to the user along the candidate exit path. In this example, the system 100 can select a particular candidate exit path as the second path even though it's not the shortest path or the path with the lowest number of obstructions if it provides the safest passage to an exit of the property.

In some implementations, the first path to the location of the individual inside the property represents a path that can only be navigated by the drone device 120, and the second path to direct the user away from the emergency condition is a path that is safe for the user. For example, the first path can be a shortcut that allows the drone device to reach the user in the shortest period of time to provide emergency assistance if the user is in distress. In such implementations, the drone device can, for instance, navigate through the first path through small openings.

The process 400 can include the operation of navigating the first path to the person and the second path to guide the person away from the emergency condition (450). For instance, in the example depicted in FIG. 3, the drone device 130 navigates the first path to the user 102 and the second path to guide the user 102 away from the emergency condition toward an exit of the property 310. As discussed above, the first and second paths can be determined based on selecting suitable paths from multiple candidate paths.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output.

The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method performed by one or more computing devices, the method comprising:
    obtaining sensor data from one or more sensors that are located at a property;
    determining, using the sensor data, that there is an emergency condition at the property;
    determining that a person is inside the property during the emergency condition at the property;
    in response to (i) determining that there is the emergency condition at the property and (ii) determining that the person is inside the property during the emergency condition at the property, determining a location of the person inside the property;
    determining, using the sensor data and the location of the person inside the property, a first path to the person; and
    in response to determining the first path to the person, performing one or more actions using the first path to the person.

2. The method of claim 1, wherein performing the one or more actions comprises:
    transmitting one or more alert notifications to an emergency services system.

3. The method of claim 1, wherein performing the one or more actions comprises:
    requesting information about the emergency condition at the property.

4. The method of claim 1, comprising:
    navigating the first path to the person; and
    prompting the person for input data.

5. The method of claim 4, wherein prompting the person for input data comprises:
    requesting information about the emergency condition at the property.

6. The method of claim 1, wherein performing the one or more actions comprises:
    initiating a call for the person inside the property.

7. The method of claim 6, wherein initiating the call comprises initiating the call to one or more contacts for the person inside the property.

8. The method of claim 1, comprising:
    determining, using the sensor data and the location of the person inside the property, a second path to guide the person inside the property away from the emergency condition; and
    navigating the second path to guide the person away from the emergency condition.

9. The method of claim 1, wherein determining that the person is inside the property during the emergency condition at the property comprises:
    receiving, from a mobile device of the person, location information of the person.

10. The method of claim 8, wherein the emergency condition comprises one or more fires at the property.

11. A system comprising:
    one or more computing devices; and
    one or more storage devices storing instructions that cause the one or more computing devices to perform operations comprising:
        obtaining sensor data from one or more sensors that are located at a property;
        determining, using the sensor data, that there is an emergency condition at the property;
        determining that a person is inside the property during the emergency condition at the property;
        in response to (i) determining that there is the emergency condition at the property and (ii) determining that the person is inside the property during the emergency condition at the property, determining a location of the person inside the property;
        determining, using the sensor data and the location of the person inside the property, a first path to the person; and
        in response to determining the first path to the person, performing one or more actions using the first path to the person.

12. The system of claim 11, wherein performing the one or more actions comprises:
transmitting one or more alert notifications to an emergency services system.

13. The system of claim 11, wherein performing the one or more actions comprises:
requesting information about the emergency condition at the property.

14. The system of claim 11, comprising:
navigating the first path to the person; and
prompting the person for input data.

15. The system of claim 14, wherein prompting the person for input data comprises:
requesting information about the emergency condition at the property.

16. The system of claim 11, wherein performing the one or more actions comprises:
initiating a call for the person inside the property.

17. The system of claim 16, wherein initiating the call comprises initiating the call to one or more contacts for the person inside the property.

18. The system of claim 11, wherein the operations comprise:
determining, using the sensor data and the location of the person inside the property, a second path to guide the person inside the property away from the emergency condition; and
navigating the second path to guide the person away from the emergency condition.

19. At least one non-transitory computer-readable storage media storing instructions that cause one or more processors to perform operations comprising:
obtaining sensor data from one or more sensors that are located at a property;
determining, using the sensor data, that there is an emergency condition at the property;
determining that a person is inside the property during the emergency condition at the property;
in response to (i) determining that there is the emergency condition at the property and (ii) determining that the person is inside the property during the emergency condition at the property, determining a location of the person inside the property;
determining, using the sensor data and the location of the person inside the property, a first path to the person; and
in response to determining the first path to the person, performing one or more actions using the first path to the person.

20. The non-transitory computer-readable storage media of claim 19, wherein performing the one or more actions comprises:
transmitting one or more alert notifications to an emergency services system.

* * * * *